United States Patent Office 3,077,412
Patented Feb. 12, 1963

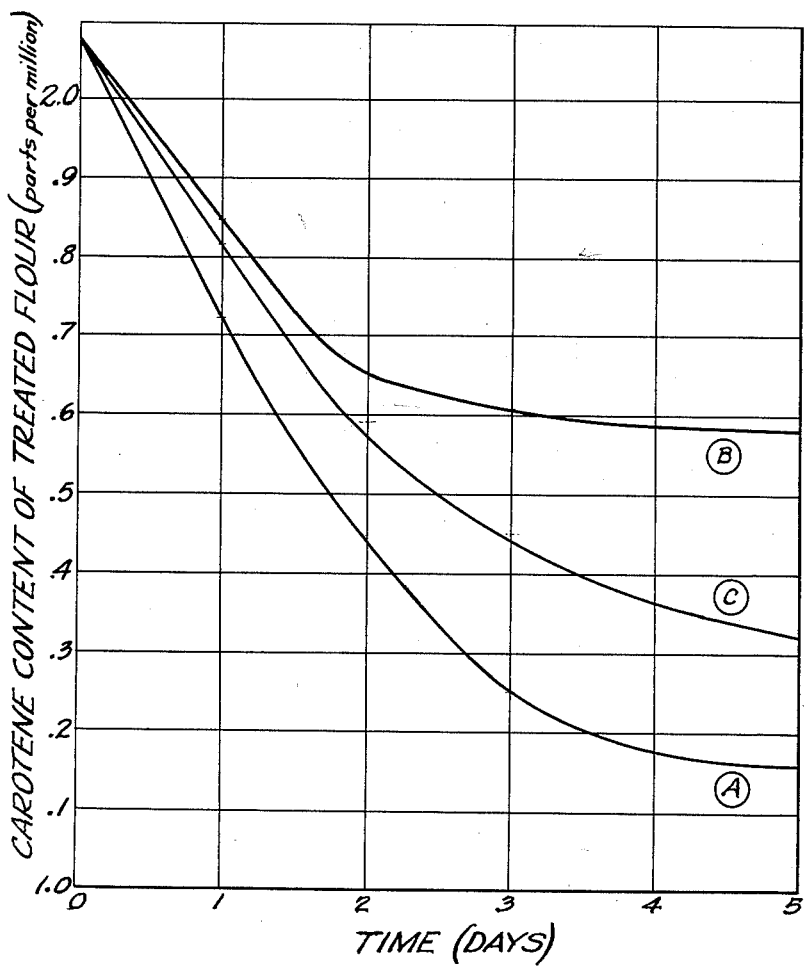

3,077,412
PREPARATION AND METHODS OF EMPLOYING OXIDATIVELY ACTIVE MATERIALS
Kazuo Higashiuchi, Chicago, Ill., assignor to J. R. Short Milling Company, Chicago, Ill., a corporation of Illinois
Filed Dec. 14, 1960, Ser. No. 75,774
9 Claims. (Cl. 99—232)

This invention relates to oxidatively active materials, their preparation, and bleaching methods employing the same, and more particularly to the production of novel peroxidic materials exhibiting flour bleaching and maturing capabilities. This application is a continuation-in-part of my application Serial No. 822,235, filed June 23, 1959, now abandoned.

Copending application Serial No. 15,783, filed June 23, 1959, on behalf of Herbert O. Renner, describes oxidatively active compositions prepared by aging mixtures of acetone and aqueous hydrogen peroxide under conditions such that, while the resulting reaction product mixture is at least substantially free from cyclic acetone peroxides in solid form, the same contains a major proportion of acyclic peroxides in solution. Thus, a typical reaction mixture prepared in accordance with the aforementioned copending application may contain at least 30% by weight, or more, of total organic peroxides, only a negligible proportion of which is made up by the cyclic dimeric and trimeric acetone peroxides. Of this organic peroxide content, a substantial proportion, usually in excess of 10% by weight of the reaction mixture, for the stronger reaction mixtures, has been found to be bis-(1,1'-hydroperoxy 1,1'-methyl) diethyl peroxide. As has been fully disclosed in said application Serial No. 15,783, such reaction mixtures, as well as bis-(1,1'-hydroperoxy 1,1'-methyl) diethyl peroxide per se, have been found to be capable of both bleaching and maturing flour. Such dual capability is unusual, chlorine dioxide being the only presently accepted prior-art agent capable of both bleaching and maturing flour.

The present invention is based upon the discovery that, at least for flour bleaching and dough conditioning purposes, the water- and ether-soluble peroxidic material remaining after extracting such reaction mixtures with a low boiling hydrocarbon solvent for organic peroxides, which extraction removes all or at least a major proportion of the bis-(1,1'-hydroperoxy 1,1'-methyl) diethyl peroxide, is superior to both bis-(1,1'-hydroperoxy 1,1'-methyl) diethyl peroxide per se and reaction product mixtures containing bis-(1,1'-hydroperoxy 1,1'-methyl) diethyl peroxide as the primary peroxidic ingredient.

I have found that, when acetone and hydrogen peroxide are reacted in the manner disclosed in said copending application Serial No. 15,783, at least the predominant proportion of the organic peroxide content of the reaction product mixture consists of two acyclic peroxides. The first of these two compounds is 2,2-dihydroperoxypropane, having the formula

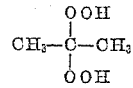

and the second is bis-(1,1'-hydroperoxy 1,1'-methyl) diethyl peroxide, having the formula

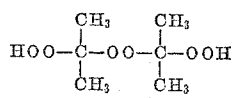

For convenience, both compounds will be considered as acyclic "actone peroxides" with the first compound hereinafter called the monomer and the second hereinafter called the dimer.

I have succeeded in isolating the monomer in substantially pure form, with only a very small amount of free hydrogen peroxide remaining as an impurity, and find this compound to be an unusually stable peroxide having marked flour bleaching and flour maturing capabilities. Stability of this compound, containing two hydroperoxy groups bonded to a single carbon, is surprising, particularly in view of the fact that the related compound 2-hydroxy-2-hydroperoxy propane appears to be only a fugitive intermediate. Nevertheless, I have found that the monomer is markedly more stable than the dimer and is admirably suited for use under the environmental conditions of flour bleaching and maturing processes.

Depending upon the particular manner in which acetone and hydrogen peroxide are reacted, under the reaction conditions hereinafter specified, the reaction product mixture may have a monomer-to-dimer ratio ranging from considerably less than 1.0, for high dimer reaction product mixtures, to as much as 10.0 and higher, for reaction product mixtures produced under conditions most favorable to production of the monomer. While the present invention contemplates recovery of the monomer in at least substantially pure form, and also production of compositions in which the organic peroxide content consists essentially of the monomer, it is to be recognized that the invention also embraces advantageous compositions which contain not only major proportions of monomer but also minor proportions of dimer. I have found that compositions containing the monomer and the dimer in a weight ratio of at least 3:1 are particularly advantageous for flour bleaching and maturing and for dough conditioning purposes.

Reaction product mixtures in which the organic peroxide content at least predominantly comprises the monomer and dimer can be prepared by combining hydrogen peroxide and acetone in a weight ratio of from 20:1 to 1:100, with water amounting to 5–95% by weight of the reaction mixture and with 0–15% by weight of an acid catalyst, and maintaining the reaction mixture at a temperature of from 20° C. to the boiling point of the mixture for a period of time ranging from a few seconds, for high temperature high catalyst conditions, to as much as 50 weeks, for low temperature conditions in the absence of catalyst. On the one hand, the reaction variables are determined by the requirement that a substantial yield of acyclic acetone peroxides must be attained. On the other hand, the variables are determined by the requirement that formation of polymeric peroxides be at least minimized and formation of cyclic peroxides in solid form (e.g., a precipitate of cyclic trimeric acetone peroxide) be avoided. Broadly, the overall range of variables affecting the process are illustrated below:

| Temperature (° C.) | Catalyst (Percent by Weight) | Time |
| --- | --- | --- |
| −20 | 15.0 (Phosphoric acid) | 1–3 hours. |
| 4 | None | 2–50 weeks. |
| 4 | 0.1 (Phosphoric acid) | 24 hours–2 weeks. |
| 15 | 15.0 (Phosphoric acid) | 10–20 minutes. |
| Room | None | 1–2 weeks. |
| Do | 1.0 (Weak acid) | ½–12 hours. |
| Do | 1.0 (Phosphoric acid) | 30–90 minutes. |
| Do | 1.0 (Hydrochloric acid) | 10–30 minutes. |
| Boiling point | None | 30 minutes–several hours. |
| Do | 0.1 (Phosphoric acid) | Several minutes. |
| Do | 2.0 (Phosphoric acid) | Several seconds. |

In accordance with the invention, peroxidic materials which gain an advantage because of the superior characteristics of the monomer can be obtained in two ways. On the one hand, a reaction product mixture can be prepared which contains a relatively large proportion of total acyclic peroxides, predominantly comprising the monomer and the dimer, and this mixture can then be extracted with a low boiling hydrocarbon solvent for peroxides, so that the monomer is left in the residue as essentially the only organic peroxide present. On the other hand, the reaction conditions can be so selected that the resulting reaction product mixture has a relatively large acyclic peroxide content predominantly comprising the monomer so that, while the dimer is present, it is present only as a minor constituent in such a proportion that the expense of its removal is not justified.

In following the first procedure, the reaction mixture is so constituted as to provide a reaction product the organic peroxide content of which is 20-50% by weight, 10-35% of the total peroxide content of the reaction product mixture being extractable by a low boiling hydrocarbon solvent, such as hexane or pentane, at room temperature, the remainder of the peroxide content being the monomer, soluble in both water and ethyl ether but substantially insoluble in hexane. The monomer-containing liquid residue of the reaction product mixture which remains after extraction with the hexane or pentane is advantageously combined, with or without further purification, with a carrier material, at least the major proportion of the unreacted acetone being removed by evaporation during the combining step. As carrier materials, edible, finely particulate solids, especially starches such as corn starch, heat-modified starches, dextrines, wheat flour, wheat gluten, vegetable proteins such as soy protein, and edible inorganic materials, such as the inorganic phosphates and calcium sulfate, are advantageous. Instead of particulate solids, I can employ liquid carriers, such as paraffin oil, dibutyl phthalate, etc.

Alternatively, the aqueous residue containing the monomer can be introduced directly into the flour or other material to be treated.

The following examples illustrate typical embodiments of the invention involving separation of the monomer from the dimer.

EXAMPLE 1

An initial reaction mixture was prepared by blending 74 ml. absolute acetone and 57 ml. aqueous hydrogen peroxide (50% $H_2O_2$ by weight) and reaction was accomplished by refluxing the mixture under a condenser for one hour. The resulting reaction product mixture was a clear liquid, with no observable precipitate, had a total peroxide content of 28% by weight, and contained only about 3% by weight of unreacted hydrogen peroxide.

One hundred ml. of the reaction product mixture was successively extracted with 5 lots of hexane, each 600 ml. in volume. The aqueous residue was recovered. The five extracts were combined.

Composition A was prepared by blending 10 ml. of the aqueous residue with 25 g. of dry, food grade corn starch, the resulting composition exhibiting by titration a hydrogen peroxide equivalent strength of 8.8% by weight. Composition B was prepared by blending 25 ml. of the combined hexane extract with 20 g. dry, food grade corn starch and removing the hexane under vacuum to provide a composition consisting essentially of bis-(1,1'-hydroperoxy 1,1'-methyl) diethyl peroxide supported on starch, such composition exhibiting by titration a hydrogen peroxide equivalent strength of 0.78% by weight. Composition C was prepared by blending 10 ml. of the initial reaction product mixture with 25 g. dry, food grade corn starch to provide a composition exhibiting by titration a hydrogen peroxide equivalent content of 9.5% by weight.

Compositions A, B and C were each blended with separate quantities of unbleached bread wheat flour (Liberty Special), with the compositions employed in amounts carrying into the flour a hydrogen peroxide equivalent equal to 0.003% of the flour weight. The carotene content of the treated flour was determined periodically, with the results seen in the accompanying drawing. Thus, even though the three compositions provided the same hydrogen peroxide equivalent, composition A accomplished in three days approximately one-third more carotene removal than composition C and over one-third more carotene removal than composition B.

A portion of the aqueous residue was vacuum distilled for removal of free water and hydrogen peroxide, yielding a viscous material found by titration to contain 3% free hydrogen peroxide and 97% organic peroxide, by weight. The active oxygen content of the organic peroxide was determined by titration with .1 N thiosulfate and calculation in accordance with the following formula:

$$\frac{(\text{Titration value})(0.0008)(100)}{\text{Sample weight}}$$

$= \text{Percent active } O_2 \text{ by weight}$

The active oxygen was found to be 29.8%, only .2% more than the theoretical active oxygen content of 2,2-dihydroperoxy propane.

The following example not only illustrates another procedure for producing reaction product mixtures in accordance with the invention which contain the monomer but also demonstrates the manner in which I have determined quantitatively the amounts of monomer and dimer produced.

EXAMPLE 2

An initial reaction product mixture was prepared by blending 74 ml. absolute acetone with 57 ml. aqueous hydrogen peroxide (50% $H_2O_2$ by weight). Reaction was accomplished by maintaining the mixture at room temperature for 20 days, the reaction product mixture at the end of that time being a clear liquid containing no observable precipitate. The reaction product mixture was analyzed for total peroxide, organic peroxide, free hydrogen peroxide, dimer, monomer and free acetone, as follows:

(1) *Total peroxide.*—A 0.100 ml. sample of the liquid reaction product mixture is combined with 50 ml. aqueous sulfuric acid (1 part conc. $H_2SO_4$ to 9 parts $H_2O$ by volume) and 1 ml. saturated potassium iodide solution is added. After liberation of iodine is complete, titrate with .1 N thiosulfate. Calculate as follows:

$$\frac{(\text{Titration value in ml.}) (0.0017) (100)}{\text{sample weight}}$$

$= \text{hydrogen peroxide equivalent value in percent by weight}$ (2) *Organic peroxide.*—A 0.100 ml. sample of the liquid reaction mixture is combined with 25 ml. water and 1 mg. catalase added, the mixture then being allowed to stand for 10 minutes. Then add 25 ml. aqueous sulfuric acid (1 part conc. $H_2SO_4$ to 4 parts $H_2O$ by volume) and titrate and calculate in the same manner as for total peroxide.

(3) *Free hydrogen peroxide.*—Calculate by subtracting organic peroxide value from total peroxide value, both obtained as described above.

(4) *Dimer (bis-(1,1'-hydroperoxy 1,1'-methyl) diethyl peroxide).*—Extract exhaustively, using 5 or more successive volumes of hexane or pentane with a volume ratio of solvent-to-sample of 50:1. Titrate the extract for total organic peroxide, by Wheeler Titration Procedure but omitting chloroform. To prove that the organic peroxide determined by this titration is essentially the dimer, remove free acetone and solvent from a sample of the extract by vacuum distillation, dissolve the residue in cold hexane, dry with anhydrous sodium sulfate, cool to −70° C. on Dry Ice-ethyl alcohol bath to precipitate the peroxide, decant solvent, and determine the melting point of the precipitate (melting point of bis-(1,1'-hydroperoxy 1,1'-methyl) diethyl peroxide=36° C.).

(5) *Monomer (2,2-dihydroperoxy propane).*—Caculate by subtracting percent dimer, obtained by titration as above (paragraph 4), from organic peroxide, determined above (paragraph 2). To prove that material is the monomer, determine active oxygen as per Example 1.

(6) *Acetone*.—Add 0.200 ml. of the liquid reaction product mixture to 200 ml. of 0.3% hydroxylamine hydrochloride solution and let stand exactly 3 minutes. Then, using pH meter, titrate with .1 N sodium hydroxide to determine liberated HCl. Calculate as follows:

$$\frac{(\text{Titration value}) \div (0.00598) \times (100)}{\text{Sample weight}} = \text{Percent acetone by weight}$$

So analyzed, the reaction product mixture of this example has the composition tabulated below:

| Component: | Percent by weight |
|---|---|
| Free $H_2O_2$ | 2.70 |
| Free acetone | 24.46 |
| Free $H_2O$ | 33.73 |
| Monomer | 34.28 |
| Dimer (possible traces of higher polymers) | 4.83 |
| Total | 100.00 |

EXAMPLE 3

An initial reaction mixture was obtained by mixing 74 ml. absolute acetone and 57 ml. aqueous hydrogen peroxide (50% $H_2O_2$ by weight). Reaction was accomplished by maintaining the mixture for 25 days at room temperature. The resulting reaction mixture had the following composition:

| | G. |
|---|---|
| Organic peroxides | 49.4 |
| Water | 42.6 |
| Acetone | 30.9 |
| Hydrogen peroxide | 3.4 |

The reaction mixture was sequentially extracted with five 600 ml. volumes of hexane, the extracts combined and the aqueous residue recovered. The combined extracts contained, by titration, approximately 11% by weight of the total organic peroxide content of the reaction mixture. Of this 11%, the major proportion was the dimer, with only traces of other organic peroxides. The aqueous residue, containing the balance of the original organic peroxide content and consisting essentially of the monomer, proved to be superior, as a flour bleaching agent, to both the overall reaction mixture and the hexane-soluble fraction thereof, when used at the same hydrogen peroxide equivalent level.

In the foregoing examples, the material employed to treat flour is the aqueous residue remaining after extraction with hexane or pentane, the organic peroxide content thereof at least predominantly comprising the monomer. As will be clear from the following example, the aqueous residue can be refined easily to provide a material wherein the proportion of monomer is in excess of 90% by weight.

EXAMPLE 4

An initial liquid mixture was prepared by blending 114 ml. aqueous hydrogen peroxide solution (50% $H_2O_2$ by weight) with 149 ml. acetone. To provide the desired reaction product mixture this liquid blend was maintained at room temperature for 20 days, yielding a clear liquid product free from crystals. The unreacted acetone was removed from the reaction product mixture by aspirating with filtered air from an air compressor for 30 minutes, 214 g. of acetone-free product being obtained.

The resulting liquid product was extracted twice with hexane, first with 600 ml. of the solvent and then with 400 ml., the extracts being separated from the residue and discarded. The entire residue was then extracted with 400 ml. ethyl ether, the extract recovered, and the ethyl ether evaporated off. The product so obtained is a clear liquid predominantly comprising the monomer, minor quantities of water, free hydrogen peroxide and hexane-soluble organic peroxides, the latter being largely removable by further extraction with hexane. The final product contains in excess of 90% by weight of water-soluble monomer and is found to be superior, as a flour bleaching agent, to both the initial acetone-peroxide reaction mixture as a whole and bis-(1,1'-hydroperoxy 1,1'-methyl) diethyl peroxide per se.

The foregoing examples have the unique advantage of providing both (1) a superior product useful for bleaching and maturing wheat flour and (2) bis-(1,1'-hydroperoxy 1,1'-methyl) diethyl peroxide, the latter being produced as a by-product which can be used for other purposes.

As described and claimed in copending application Serial No. 75,692, filed December 14, 1960, by Kazuo Higashiuchi and Edward J. Schwoegler, acetone and hydrogen peroxide can be so reacted as to provide a reaction product mixture containing a high yield of monomer and dimer with the weight ratio of monomer to dimer in excess of 3:1. Such reaction product mixtures are admirably suited for use as flour bleaching materials, with no or minimal refinement, since the high proportion of monomer and the high concentration of combined monomer and dimer assures excellent bleaching and maturing power.

Stated broadly, such high-monomer reaction product mixtures are produced by combining hydrogen peroxide and acetone in a molar ratio of from 1.5:1 to 6:1 with sufficient water to provide 5–95% by weight water in the reaction mixture, and reacting for from 10 minutes to 6 hours at from $-20°$ C. to $+35°$ C. in the presence of 0.15–15% by weight of phosphoric acid as a catalyst. Particularly good results are obtained when the molar ratio of hydrogen peroxide to acetone is kept in the range of from 2:1 to 3:1 and the reaction is carried out at from $-10°$ C. to $+15°$ C., with the phosphoric acid amounting to 1.5–6% by weight and the reaction time being 30–60 minutes. Within even the broader limits just referred to, a yield of combined monomer and dimer amounting to at least 60%, computed as hydrogen peroxide equivalents and based on the hydrogen peroxide in the initial reaction mixture, is assured, with the monomer-to-dimer weight ratio being at least 3:1. The following examples are illustrative.

EXAMPLE 5

A number of high-monomer reaction product mixtures were prepared, all employing 23.4 g. acetone in the reaction mixture, with aqueous hydrogen peroxide (50% $H_2O_2$) and phosphoric acid being employed in the amounts indicated below. All reactions were carried out at 15° C., the time periods being indicated below.

| Run | $H_3PO_4$/mole Acetone (grams) | $H_2O_2$/Acetone (molar ratio) | Time (hours) | Yield in Grams | |
|---|---|---|---|---|---|
| | | | | Monomer | Dimer |
| 5A | .288 | 1.5 | 2.0 | 21.25 | 5.93 |
| 5B | .288 | 2.0 | 1.0 | 28.30 | 5.44 |
| 5C | .144 | 2.0 | 4.0 | 29.13 | 7.70 |
| 5D | .288 | 2.5 | 1.0 | 28.00 | 5.20 |
| 5E | 3.000 | 2.5 | 0.5 | 31.75 | 5.17 |

The reaction products of runs 5A–5E all are markedly superior as flour bleaching compositions, both as compared to the pure dimer and as compared to reaction product mixtures having a relatively low monomer content.

EXAMPLE 6

Two identical mixtures of 23.4 g. acetone, 68.25 g. aqueous hydrogen peroxide (50% $H_2O_2$) and phosphoric acid amounting to 12.0 g./mole acetone were prepared. One of these mixtures was allowed to react for 30 minutes at 15° C., producing a clear, precipitate-free liquid product containing 32.7 g. monomer and 6.35 g. dimer. The other was allowed to react for 1 hour at $-10°$ C., producing a clear, precipitate-free liquid product containing 30.85 g. monomer and 4.51 g. dimer.

EXAMPLE 7

An initial reaction mixture consisting of 23.5 g. acetone, 34.1 g. hydrogen peroxide (100%), phosphoric acid amounting to 3.0 g./mole acetone, and water sufficient to constitute 52.5% by weight of the reaction mixture, was allowed to react for 30 minutes at 15° C. The resulting clear liquid product, containing no solid peroxides, contained 27.2 g. monomer and only 2.72 g. dimer. Flour bleaching and maturing compositions having decidedly more than 133% of the flour bleaching capabilities exhibited by the dimer are prepared by blending the clear liquid reaction product with dry, food grade corn starch at the rate of 10 ml. of the reaction product to each 25 g. of the starch. The same starch-supported compositions, heated for 30 minutes over a boiling water bath for removal of free acetone and water, is an excellent bread dough maturing agent capable of bleaching the dough and providing increased water absorption when employed at a rate yielding in the dough a hydrogen peroxide equivalent content of from a few thousandths to a few hundredths percent of the flour weight.

Peroxidic compositions prepared in accordance with Examples 5–7 have excellent flour bleaching and maturing capabilities, all being over 33% more effective than compositions containing the dimer as the main peroxidic constituent.

In preparing carrier-supported compositions in accordance with the invention for bleaching and/or maturing flour, the peroxidic material (whether it be the monomer in substantially pure form or an aqueous solution containing the monomer and the dimer in a weight ratio of at least 3:1) is combined with the particulate carrier material in proportions providing a hydrogen peroxide equivalents content of 5–30% by weight of the total carrier-supported composition. The composition is then introduced into flour at a rate providing a hydrogen peroxide equivalent weight equal to 0.001–0.01% of the flour weight.

Aqueous solutions containing the monomer as substantially the sole organic peroxide, and reaction product mixtures containing the monomer and dimer in weight ratios of at least 3:1, are particularly useful in preparing dough maturing compositions in the manners described in copending applications Serial No. 15,782, filed June 23, 1959, on behalf of Herbert O. Renner, and Serial No. 822,172, filed June 23, 1959, by Charles G. Ferrari and Kazuo Higashiuchi.

What is claimed is:

1. The method for preparing an oxidatively active composition suitable for both bleaching and maturing flour comprising providing a liquid reaction product mixture derived from acetone and hydrogen peroxide and characterized by (a) presence of a substantial proportion of acyclic peroxides, a material part of such proportion being constituted by bis-(1,1'-hydroperoxy 1,1'-methyl) diethyl peroxide, and (b) absence of solid cyclic acetone peroxides; extracting said reaction mixture with a low boiling hydrocarbon solvent, and combining at least the major portion of the organic peroxide content of said aqueous residue with a carrier material.

2. The method of claim 1 wherein all of said aqueous residue is combined with a carrier material.

3. The method of claim 1 wherein unreacted acetone is removed from said reaction product mixture by volatilization prior to said extraction.

4. The method for preparing an oxidatively active composition suitable for both bleaching and maturing flour comprising providing a liquid reaction product mixture derived from acetone and aqueous hydrogen peroxide and characterized by containing in solution a first organic peroxide fraction insoluble in hexane and a second organic peroxide fraction soluble in hexane, the organic peroxide content of both of said fractions consisting essentially of acyclic peroxides, removing said second fraction from the reaction mixture by extraction, and combining the remaining aqueous residue, containing said first fraction, with a carrier material.

5. The method for preparing an oxidatively active composition suitable for both bleaching and maturing flour comprising providing a liquid reaction product mixture derived from acetone and aqueous hydrogen peroxide and characterized by containing in solution a first organic peroxide fraction insoluble in hexane and a second organic peroxide fraction soluble in hexane, the organic peroxide content of both of said fractions consisting essentially of acyclic peroxides, removing said second fraction from the reaction mixture by extraction, recovering said first fraction from the aqueous residue, and combining the recovered organic peroxide material with a carrier material.

6. The method for bleaching flour comprising combining therewith a small but effective proportion of a bleaching composition comprising an organic peroxide material combined with a carrier, said organic peroxidic material consisting essentially of 2,2-dihydroperoxy propane and bis-(1,1'-hydroperoxy 1,1'-methyl) diethyl peroxide, the 2,2-dihydroperoxy propane being present in an amount equal to at least three times the weight of bis-(1,1'hydroperoxy 1,1'-methyl) diethyl peroxide.

7. The method for treating flour to at least mature the same comprising combining therewith a small but effective proportion of an organic peroxidic material free from material amounts of solid cyclic organic peroxides, said organic peroxidic material consisting of acyclic acetone peroxides and at least predominantly comprising 2,2-dihydroperoxy propane.

8. The method for treating flour to at least mature the same comprising combining therewith a small but effective proportion of an organic peroxidic material consisting essentially of 2,2-dihydroperoxy propane.

9. A composition useful for oxidatively treating flour and conditioning yeast-leavened doughs comprising 2,2-dihydroperoxy propane and bis-(1,1'-hydroperoxy 1,1'-methyl) diethyl peroxide in an amount not exceeding one-third the weight of the 2,2-dihydroperoxy propane.

References Cited in the file of this patent

UNITED STATES PATENTS

| 1,866,412 | Van der Lee | July 5, 1932 |
| 2,903,361 | Marks et al. | Sept. 8, 1959 |

FOREIGN PATENTS

| 444,544 | Great Britain | Mar. 23, 1936 |

OTHER REFERENCES

Milas et al.: Abstracts of Papers, 136th Meeting American Chemical Society, September 1959, pages 78P–79P, 2 pages.